Feb. 3, 1970 R. W. ERICKSON 3,492,774

METHOD AND APPARATUS FOR PACKAGING CONTAINERS IN A ONE-PIECE CARRIER

Original Filed Dec. 13, 1965 5 Sheets-Sheet 1

INVENTOR.
RICHARD W. ERICKSON
BY
Brumbaugh, Free, Graves & Donohue

INVENTOR.
RICHARD W. ERICKSON
BY
Brumbaugh, Free, Graves & Donohue

INVENTOR.
RICHARD W. ERICKSON
BY Brumbaugh, Free,
Graves & Donohue

INVENTOR.
RICHARD W. ERICKSON
BY
Brumbaugh, Free, Graves & Donohue

INVENTOR.
RICHARD W. ERICKSON
BY
Brumbaugh, Free,
Graves & Donohue

United States Patent Office 3,492,774
Patented Feb. 3, 1970

3,492,774
METHOD AND APPARATUS FOR PACKAGING CONTAINERS IN A ONE-PIECE CARRIER

Richard W. Erickson, Canoga Park, Calif., assignor to International Omni-Pak Corporation, New York, N.Y., a corporation of New York Original application Dec. 13, 1965, Ser. No. 513,189, now Patent No. 3,344,950, dated Oct. 3, 1967. Divided and this application Aug. 31, 1967, Ser. No. 670,497
Int. Cl. B65b *17/02, 35/54, 61/14*
U.S. Cl. 53—26 13 Claims

ABSTRACT OF THE DISCLOSURE

The specification describes several embodiments of a one-piece container carrier of a type which includes upper and lower channeled elements joined by connecting means integrally formed with both channeled elements, and a method and apparatus for packaging a plurality of containers having cylindrical chimes in both ends in the container carrier. In the method and apparatus the container carrier is set up and held in set-up condition between the containers to be packaged, and the containers to be packaged are pushed in opposite directions into the container carrier until the chimes thereof are locked in the channeled elements, whereupon the package is removed and the operation repeated.

This application is a division of my copending application Ser. No. 513,189, filed Dec. 13, 1965, now Patent No. 3,344,950, which in turn was a continuation-in-part of my application Ser. No. 139,262, filed Sept. 19, 1961.

The invention relates to a novel method and apparatus for packaging containers in a one-piece container carrrier of a type covered by my earlier Patent No. 3,344,950 and disclosed herein, that is to say, a one-piece container carrier which includes upper and lower channeled elements joined by connecting means integrally formed with both channeled elements and in which the containers are held in a cluster by the engagement of the channeled elements with the chimes of the containers.

In the packaging method and apparatus of this invention the containers are fed automatically to a position on opposite sides of a packaging station, the container carrier is fed automatically to an intermediate position, set up and held in set-up position, and the containers to be packaged are pushed in opposite directions toward the set-up container carrier until the chimes thereof are locked between the channeled elements to complete the package. The package is thereupon removed and the operation repeated.

For a more complete understanding of the present invention, reference can be made to the detailed description which follows and to the accompanying drawings in which.

Figures 4, 5, 6, 7, 8:
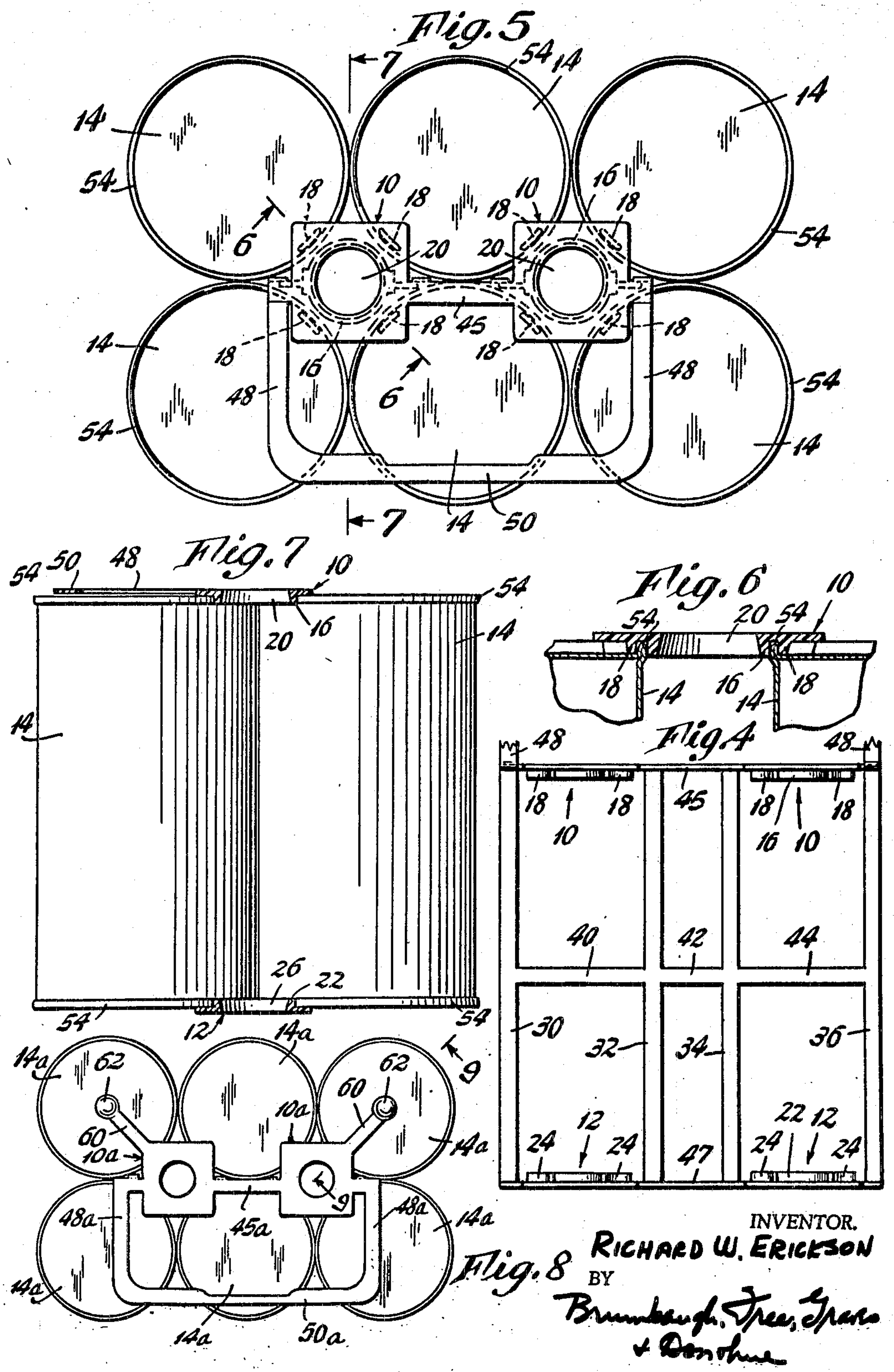
FIGURE 4 is a fragmentary front (or rear) elevational view of the set-up carrier of FIGURE 3, a portion of the handle being omitted for purposes of illustration.
FIGURE 5 is a top plan view of the set-up carrier having assembled to it six containers or cans.
FIGURE 6 is a fragmentary vertical sectional view, taken on the line 6—6 of FIGURE 5.
FIGURE 7 is a vertical sectional view, taken on the line 7—7 of FIGURE 5.
FIGURE 8 is a top plan view of a modified form of the carrier wherein spacer means are provided for engagement with end portions of the cans or containers.

Referring first to FIGURES 1 to 7, the container carrier or pack is illustrated as comprising a single molded three-dimensional plastic piece C which may be fabricated by a single molding operation. The plastic piece constituting the pack structure comprises a plurality of upper and lower channeled members 10 and 12, respectively, the said channeled members having channel-defining means which are interlockingly engageable with the tops and bottoms, respectively, of a plurality of containers, illustrated herein as circular cans 14. As seen in FIGURE 5, the containers 14 are placed side-by-side in closely spaced relation, there being six in number constituting a standard pack quantity. The channel-defining formations on the channeled elements 10 are identical and include an inner ring-shaped upstanding formation 16 and four outer curved lugs or walls 18 spaced apart from the outer wall of the ring-shaped formation at each of the corners of the channeled element 10. The channel-defining formations on the channeled elements 12 are identical and include an inner ring-shaped upstanding formation 22 and four outer curved lugs or walls 24 spaced apart from the outer wall of the ring-shaped formation at each of the corners of the channeled element 12. There are large centrally located apertures or openings 20 formed in bases of the upper channeled elements 10 and similar apertures or openings 26 formed in the bases of the lower channeled elements 12. The ring-shaped formations 16 and 22 reinforce and impart rigidity to the channeled elements 10 and 12. In addition, the inner walls of these ring-shaped formations provide gripping surfaces for handling and setting up the container carrier, as will be described below, and the openings 20 and 26 afford access to these inner walls, as well as finger gripping openings to facilitate carrying the package. Gripping elements 107 described below engage these gripping surfaces to hold the lower channeled elements 12 in position and lift the upper channeled elements 10 and orient them 180° to their overhead positions shown in FIGURE 3.

The plastic molded piece is preferably of linear polyethylene or similar plastic composition characterized by flexibility and resilience, as well as appreciable strength or toughness and resistance to tearing or rupture. Accordingly, each of the corners of channeled members 10 and 12 will readily yield to permit the chimes 54 of the containers 14 to be forced into the chime-receiving channels thereof.

Figure 1:
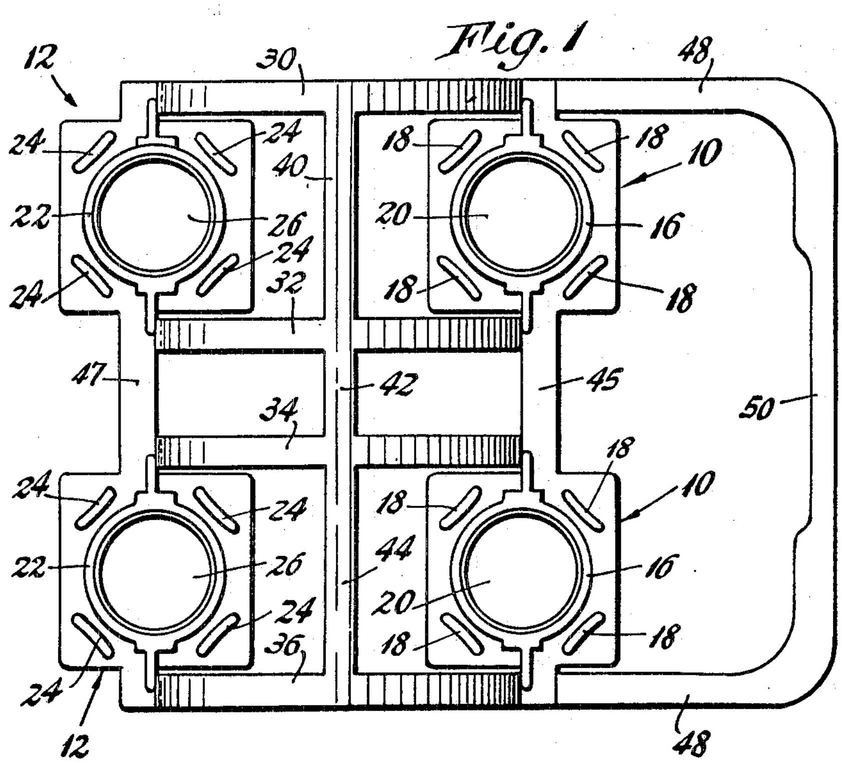
FIGURE 1 is a top plan view of one embodiment of the container carrier in which containers are packaged by the present invention.

The upper and lower channeled members 10, 12 are joined by tie means comprising a plurality of thin, flexible bands or strips 30, 32, 34 and 36. As clearly seen in FIGURE 1, the strips 30, 32 straddle or extend between opposite portions of upper and lower channeled members 10, 12, whereas the webs 34, 36 straddle the remaining set or pair of channeled members 10, 12. The strips 32, 34 are arranged in spaced, parallel relation, and tie strips 40, 42 and 44 interconnect the flexible webs 30, 32, 34 and 36 as illustrated in FIGURE 1, the said tie strips being in alignment with each other. In the embodiment illustrated in FIGURE 2, the tie means comprising the connector strips 30, 32, 34 and 36 are molded in the shape of a half loop, whereas the upper and lower channeled members 10, 12 are molded substantially in the same plane. The extremities of the strips 30, 32, 34 and are shown as connecting with the channeled members 10, 12 at substantially right angles. Tie strips 45 and 47 connect, respectively, the upper channeled members 10 and the lower channeled members 12, as seen in FIGURE 1.

Figure 3:
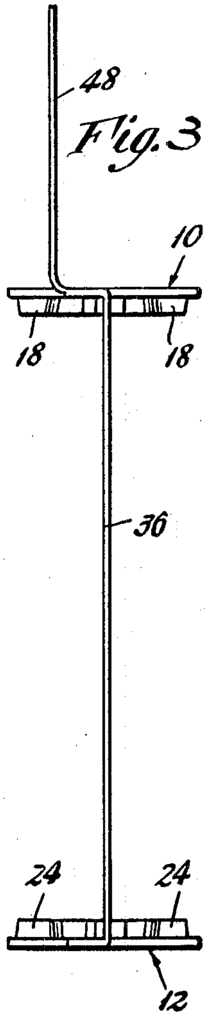
FIGURE 3 is an end elevational view of the container carrier after it has been straightened or set up in readiness for receiving the cans or containers.
Figure 2:
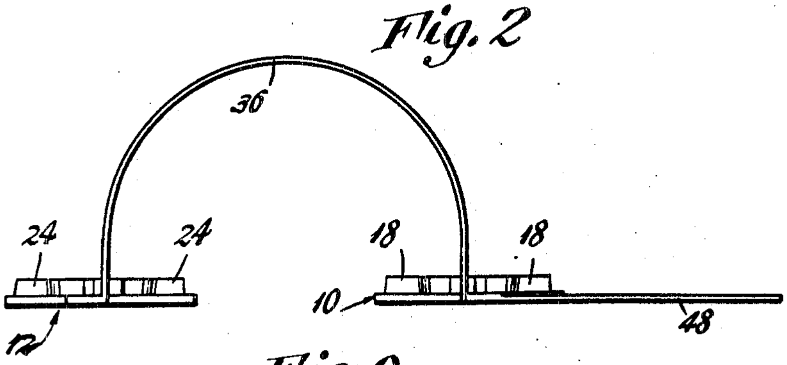
FIGURE 2 is a side elevational view of the container carrier shown in FIGURE 1.

After molding of the piece illustrated in FIGURES 1 and 2, it may be straightened to occupy or have the shape shown in FIGURES 3 and 4 whereby the carrier structure is set up and adapted to accommodate six cans or containers 14.

Referring to FIGURES 1–3, the carrier or pack structure also has a handle member which is of substantially U-shaped formation, comprising a pair of arms 48 joined to the upper channeled members 10, and a transverse handle bar 50, said arms and bar being molded in a flat shape as shown in FIGURE 2, substantially in the same plane as the channeled members 10, 12. Referring to FIGURE 5, the handle 48, 50 is arranged to lie flat against one side of the top portion of the assembled pack when the same is not in use. Accordingly, the handle requires no appreciable additional space, and this is an important feature of the invention. When the pack is to be carried, the handle 48, 50 is grasped and will bend to the position shown in FIGURE 3, wherein it extends upward from the containers 14 for carrying purposes.

It will be seen from an inspection of FIGURES 3 and 4 that the tie means comprising the strips 30, 32, 34 and 36 extend between and connect portions of the channeled members 10, 12 which are spaced from the support means comprising the ring-shaped shoulders 16, 22 and the arcuate shoulders 18, 24. The strips 30, 32, 34 and 36 together with the tie strips 40, 42 and 44 are in the form of an open rectangular framework as seen in FIGURE 4. Because of the one-piece molded construction, the channeled members 10, 12, tie means 30–36, strips 40–44 and handle 48, 50 are all integral with each other and constitute a single molded piece of resilient plastic material.

Referring to FIGURE 5, it will be seen that portions of the support means on the upper and lower channeled members 10, 12 are adapted to engage a single container, as for example, either of the centrally disposed containers at one side or the other of the pack. The channel-defining means comprising the circular shoulders 16 and 22 and curved shoulders 18 and 24 are so arranged that the chimes or flanges 54 of the containers 14 are received in and are interlockingly engaged by the respective channels. In order to remove a container from the pack, it is merely necessary for the consumer to lift one corner of an upper channeled member 10, whereby the can is easily freed for removal.

Figure 9:
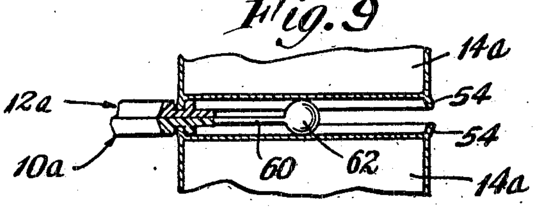
FIGURE 9 is a fragmentary vertical sectional view taken on the line 9—9 of FIGURE 8, showing also in similar section a lower portion of another pack resting on top of the pack of FIGURE 8.

The embodiment illustrated in FIGURES 8 and 9 is similar in most respects to that of FIGURES 1–7, but additionally provides spacer devices which are engageable with certain of the containers at the ends thereof, to effect a spacing of the packs when these are stacked one above the other. Portions and components which are similar to those already described above have been given similar characters but with the suffix "*a*." As shown, containers 14*a* are held assembled in a pack by upper and lower channeled members, only the members 10*a* being visible in FIGURE 8, but FIGURE 9 shows a bottom channeled member 12*a* of a second pack which has been placed on top of the pack shown in FIGURE 8.

The embodiment of FIGURES 8 and 9 has arms 60 provided with enlargements 62 in the shape of solid balls, the said enlargements being adapted to engage the juxtaposed top and bottom end portions of containers 14*a* of two packs supported one on the other. The balls 62 thus effect a spacing of the containers of the stacked packs, and provide added stability and a more precise alignment whereby a large number of packs may be stacked vertically without leaning appreciably and rendering the pile-up unstable to the extent where it might be likely to fall. The arms 60 are shown in the form of thin flat webs; supplementing the spacing effected by the balls 62 is the handle portion 48*a*, 50*a* which effects a spacing of the containers disposed at the other side of the pack. Accordingly, a stable support in at least four widely spaced locations is had, of the four corner containers of the pack, whereby a number of packs may be readily stacked vertically without danger of falling.

Figure 10:
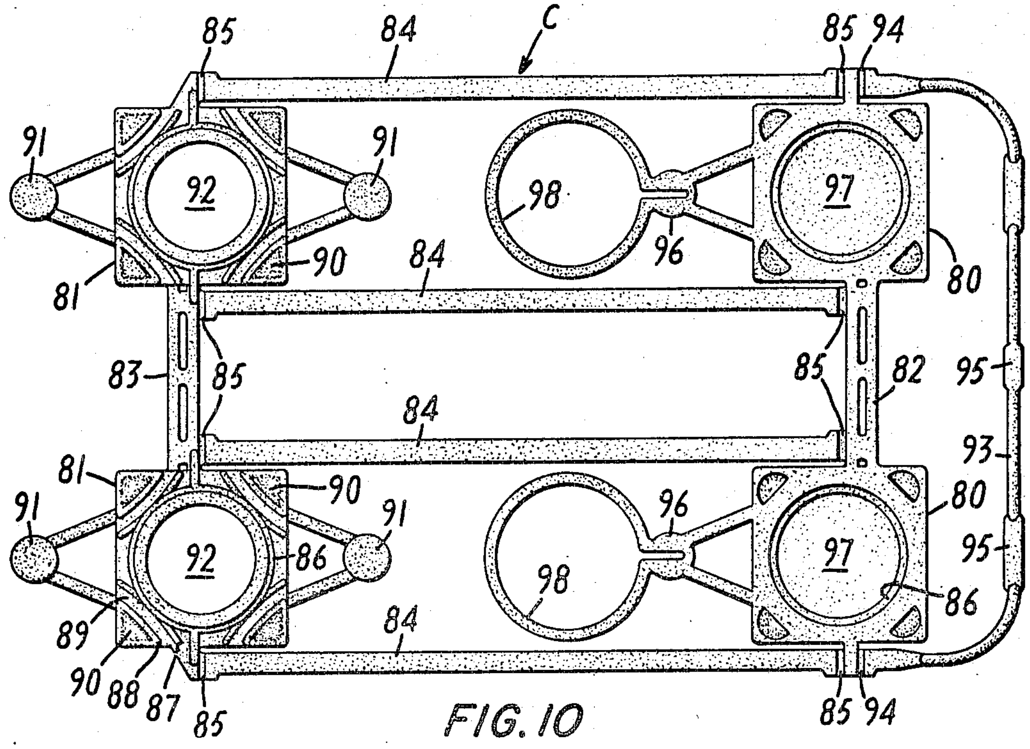
FIGURE 10 is a plan view of still another embodiment of the container carrier in which containers are packaged by the present invention.
Figure 11:
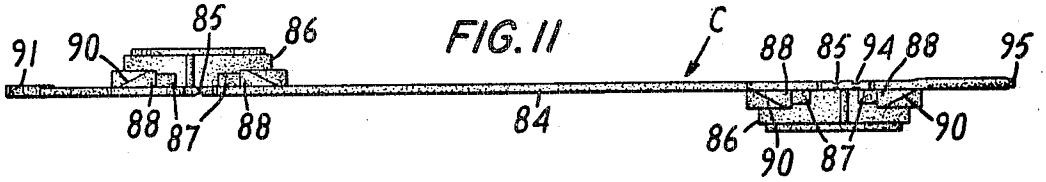
FIGURE 11 is an end view of the container carrier shown in FIGURE 10.
Figures 12, 14:
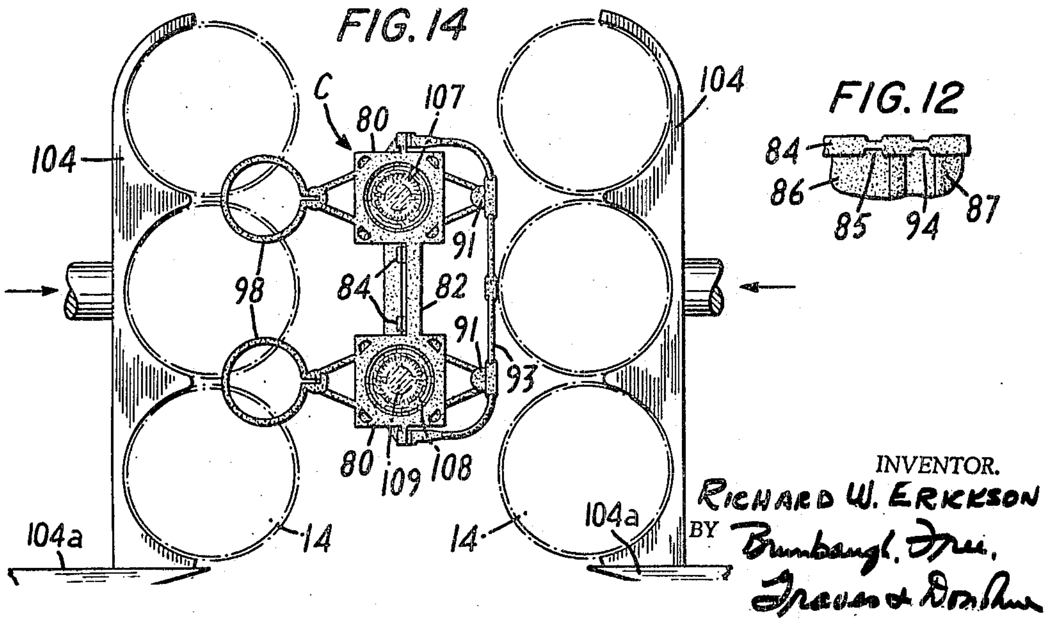
FIGURE 12 is an enlarged fragmentary view of part of FIGURE 11.
FIGURE 14 is a plan view illustrating the container carrier set up for receiving the containers to be carried thereby.

In the embodiment illustrated in FIGURES 10 through 12 the container carrier C comprises a pair of upper channeled elements 80 and a pair of lower channeled elements 81. The channel-defining formations on the upper elements 80 face oppositely to the channel-forming formations of the elements 81 to facilitate and simplify the set-up of the container carrier to receive the containers.

The upper channeled elements 80 are connected in predetermined spaced relationship by a connecting strip 82; similarly, the channeled elements 81 are connected in the same predetermined spaced relationship as the upper elements 80 by connecting strips 83. The pair of upper channeled elements 80, in turn, are connected to the pair of lower channeled elements 81 by four parallel connecting bands or strips 84. The extreme ends of all of the connecting strips 84 are provided with grooves or recesses 85 extending across one side thereof to provide hinges.

The channeled elements 80 and 81 are each three-dimensional squares comprising a centrally located circular gripping ring 86 and a pair of parallel spaced-apart curved inner and outer formations 87 and 88, respectively, at each corner of the respective element defining between them a channel 89. The outer curved formation 88 has a sloping surface 90 which provides an incline from the extreme corner of the respective channeled element so that as the chimes of the containers are pushed toward their respective channels 89 they will force apart the upper and lower channeled elements 80 and 81 until the chimes enter the channels at which time the inherent resiliency of the channeled elements and the connecting strips 84 will cause the channeled elements to snap together to lock the cointainer in place.

The lower channeled elements 81 have laterally projecting arms 91 extending from opposite edges thereof, namely, the edges closest and most remote to the channeled elements 80. These arms 91 are in the form of flat discs and engage and lend support to the chimes of side-by-side containers at approximately their lines to tangency. Gripping rings 86 having inner walls accessible from the sides opposite the sides on which the channels are formed are provided at the centers of the circular formations 86 and, as will be explained, facilitate machine handling and orientation of the lower channeled elements 81.

The upper channeled elements 80 have a handle 93 connected thereto and lying in a plane with the connecting strips 84, the bases of the channeled elements and the arms 91. The ends of the handles are provided with grooves or recesses 94, similar to the grooves or recesses 85, to form pivotal hinges. The handle 93 is also provided with flattened portions 95 which engage and help support the chimes of side-by-side containers at approximately their lines of tangency (see FIGURE 16). The handle 93 is, in use, raised to approximately right angles from its container-engaging position shown in FIGURES 10, 11, 14, 15 and 16 when it is grasped by the consumer.

The edges of the channeled elements 80 in proximity to the channeled elements 81 have arms 96 formed integrally therewith and lying in the plane of the handle and the arms 91. These arms 96 are in the form of flat discs which serve the same purpose as the arms 91.

In the particular form of the container carrier shown in FIGURES 10–12, the container carrier provides two bottle closure premiums. Toward this end, the upper channeled elements 80 have walls 97 at the lower ends (as viewed in FIGURE 11) of the circular formations 86, providing recesses in the upper surfaces of the channeled elements. Moreover, flat discs or rings 98 are formed integrally with the arm portions 96. When each of the channeled elements 80 is detached or broken away from the handle 93 and the connecting strips 82 and 84, the ring 98 of each channeled element 80 can be placed on the neck of a bottle and the recessed side of the channeled element can be snapped on the bottle to provide a closure to replace a bottle cap removed from the bottle.

Figure 13:
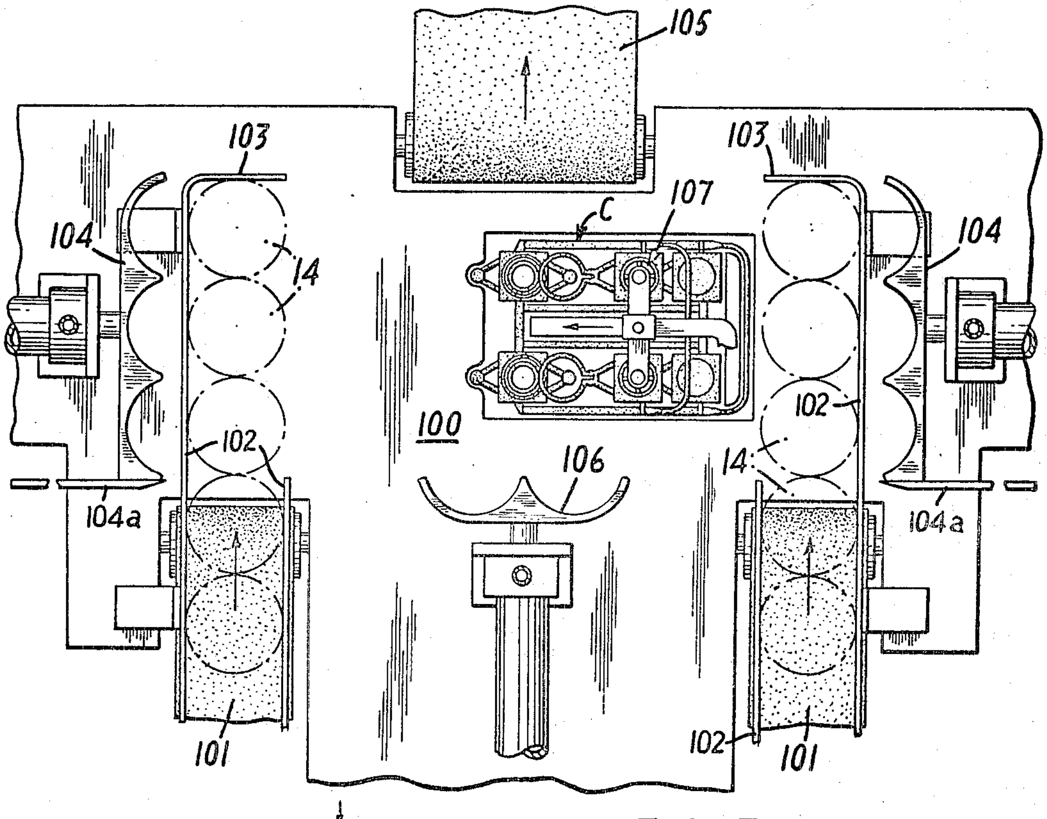
FIGURE 13 is a plan view illustrating the apparatus of the present invention for assembling containers in the container carrier.

Turning now to the method and apparatus for setting up the container carrier and packaging a cluster of containers therein, the apparatus shown in FIGURE 13 includes a flat surface 100, a pair of conveyors 101 each feeding a line of containers to the surface 100 at a loading or packaging station, relatively low walls 102 guiding the containers toward stops 103 to present a group of three containers in a waiting position on opposite sides of a container carrier, a pair of pushers 104 for pushing a group of three containers toward opposite sides of a set-up container carrier to lock the containers in the container carrier, a discharge conveyor 105, and a pusher 106 for pushing a 6-pack cluster of containers from the loading station onto the discharge conveyor 105. The pushers 104 each carry an extended wall **104*a* which serves as a gate to stop the feed of containers and maintain them in slipping engagement with the constantly moving conveyors 101 until the pushers 104** are returned to their initial positions shown in FIGURE 13.

Figure 18:
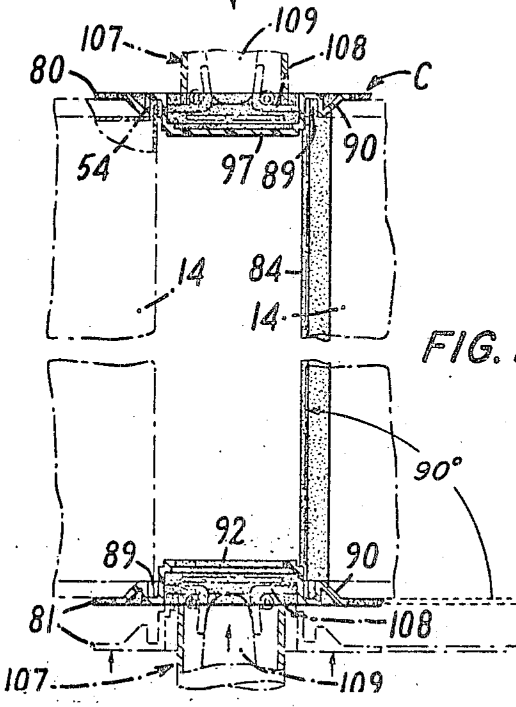
FIGURE 18 is a view similar to FIGURE 17 taken along the line 18—18 of FIGURE 15 showing the chimes of the containers locked in the channeled elements.
Figures 15, 16, 17:
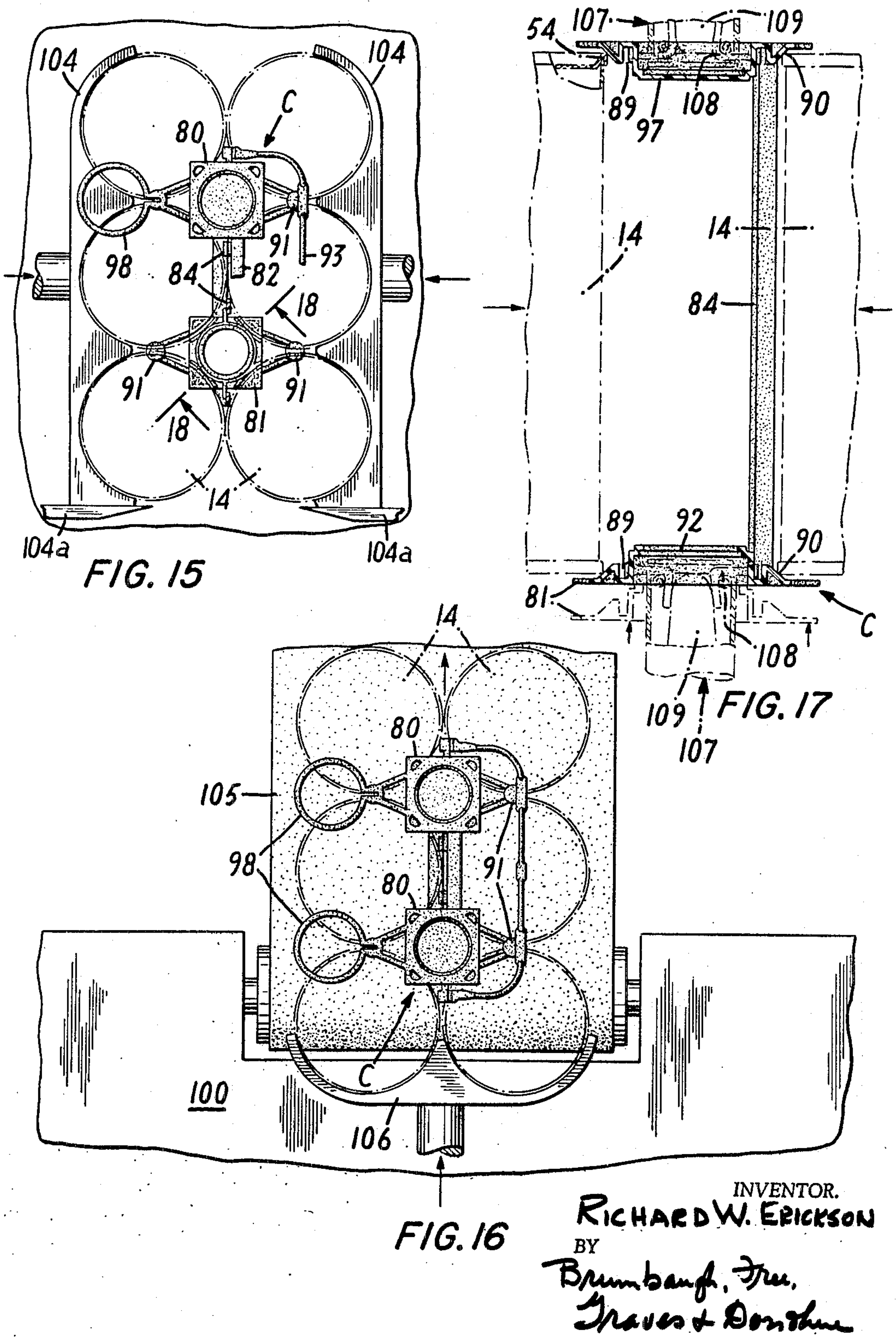
FIGURE 15 is a view similar to FIGURE 14 showing the containers assembled in the container carrier with the chimes of the containers locked within the respective channeled elements.
FIGURE 16 is a view showing the cluster of containers packaged in the container carrier being discharged from the apparatus shown in FIGURE 13.
FIGURE 17 is a cross-sectional elevation of the container carrier set up to receive the chimed containers.

The container carrier C can be fed one at a time or several at a time to the loading station from a stack, from a rotating magazine or from a continuous roll from which they can be detached. The circular gripping rings 86 of the upper channeled elements 80 can be engaged and gripped from above and the gripping rings 86 of the lower channeled elements 81 can be engaged and gripped from below by gripping elements generally designated 107. These gripping elements 107, as best shown in FIGURES 17 and 18, include a plurality of articulated fingers 108 surrounding a centrally located movable wedge 109. The actuation of the wedge 109 expands the articulated fingers 108 into gripping engagement with the gripping rings 86 of the upper and lower channeled elements 80 and 81.

In setting up the container carrier, the lower channeled elements 81 are positioned by the respective gripping elements 107 in a position between the pushers 104, and the upper gripping elements grip and swing the upper channeled elements from the side-by-side positions shown in FIGURE 10 to the overhead position shown in FIGURES 17 and 18. The upper channeled elements 80 are maintained in parallel relationship with the lower elements 81 while they are swung through a 90° arc from the side-by-side to the overhead positions, and the connecting bands or strips 84 are pivoted at the hinges 85 to upstanding positions at right angles to the channeled elements 80 and 81. It should be noted that by making the container carrier with the upper and lower channeled elements 80 and 81 facing in opposite directions, as shown in FIGURE 10, in contrast to the embodiment shown in FIGURE 1 where they face in the same direction, the gripping elements 107 can grip the upper channeled elements from above and need not be oriented in traveling through the 90° arc.

When the container carrier has been set up as shown in FIGURE 17, the pushers 104 are actuated to slide three containers toward the container carrier from opposite directions. As shown in FIGURE 17, the chimes 54 of the containers engage and slide along the sloped ramp surfaces 90 at the corners of the channeled elements 80 and 81, stretching or forcing the resilient material of the channeled elements apart until the chimes enter the channels 89, whereupon the channeled elements snap together locking the containers in a six-pack cluster in nested relationship. The pusher 106 then slides the six-pack cluster in nested relationship. The pusher 106 then slides the six-pack onto the conveyor 105 to discharge and clear the loading station for the next operation. As soon as the pushers 104 are restored to their initial positions, additional containers are advanced to the waiting positions by the conveyors 101.

It is understood that any number of containers can be assembled in one or more container carriers simultaneously. For example, the container carriers can be molded in relatively long strips or fed from a continuous roll to the assembling station and the strips subdivided either before or after the containers are locked therein into separate packages carrying any number of containers. The long continuous strips or web of container carriers is made by molding continuous strings of the lower channeled elements and continuous strings of the upper channeled elements. Packages for the desired number of containers can be made by severing the connections between particular lower channeled elements and the connections between corresponding upper channeled elements.

The invention has been shown in preferred form and by way of example only, and various modifications and variations may be made therein without departing from the spirit of the invention. The invention, therefore, is not to be limited to any particular form or embodiment except insofar as such limitations are expressly set forth in the appended claims.

I claim:

1. A method of packaging a plurality of containers having chimes at both ends in a container carrier which includes upper and lower channeled elements made of resilient material and initially lying side-by-side and connected by resilient means integrally formed with both channeled elements comprising the steps of feeding containers to positions on opposite sides of a packaging station, setting up the container carrier at the packaging station intermediate the opposite containers by holding one or the channeled elements in container receiving position and moving the other in a path limited by the connecting means from the initial side-by-side position to a position in which one channeled element is above the other with the channeled formations of each facing each other, pushing the containers on opposite sides of the packaging station toward each other and intermediate the upper and lower channeled elements, and forcing the upper and lower channeled elements apart until the chimes are locked within their respective channels in the channeled elements.

2. A method as set forth in claim 1 in which the container carrier is made with sloped-ramp surfaces extending outwardly from each channel and including the step of bringing the chimes of the containers into engagement simultaneously with the sloped-ramp surfaces so that the containers force the upper and lower channeled elements apart until the chimes drop into the respective channels, whereupon the inherent resiliency of the material draws the upper and lower channeled elements together.

3. A method as set forth in claim 1 in which at least two groups of containers are moved simultaneously in opposite directions into interlocking relationship with the set-up container carrier.

4. A method as set forth in claim 1 in which the container carrier in its initial position has the upper and lower channeled elements lying in the same plane and in which each of the channeled elements includes an upstanding annular gripping wall and including the step of gripping the said annular walls of the channeled elements from the side opposite the container engaging side, and moving the channeled elements relative to each other to position the channeled elements one above the other with the channeled formations facing each other and the channeled elements separated from each other by the maximum distance permitted by the connecting means therebetween.

5. A method as set forth in claim 4 in which in the initial position of the container carrier both channeled elements are in the same plane and facing in the same direction and in which one channeled element is oriented 180° relative to the other in moving it to the set-up condition of the container carrier.

6. A method as set forth in claim 4 in which in the initial position of the container carrier the channeled elements face in opposite directions and in which in moving the channeled elements to the set-up condition of the container carrier one of the channeled elements is moved through 90° along a path limited by the connecting means between the channeled elements and without any orientation of either channeled element.

7. A method as set forth in claim 1 in which the container carrier includes a long string of lower channeled elements integrally connected and a long string of upper channeled elements integrally connected so that relatively long lines of containers can be packaged simultaneously, and including the step of subdividing the large package into a plurality of smaller packages by severing the connections between certain lower channeled elements and between corresponding upper channeled elements.

8. An apparatus for packaging a plurality of containers having cylindrical chimes at both ends in a container carrier which includes upper and lower channeled elements initially lying side by side and joined by connecting means integrally formed with both channeled elements comprising means engaging one of the channeled elements and holding it in the container receiving position, means engaging the other channeled element and transporting it in a path limited by the connecting means from the initial side-by-side position to a position in which one channeled element is above the other at a distance permitted by the connecting means and in which the channeled elements are facing each other, and pusher means on opposite sides of the container receiving position for pushing the containers in opposite directions into the container carrier between the upper and lower channeled elements so that the containers are locked together therebetween.

9. An apparatus as set forth in claim 8 including at least two conveyors for advancing two assembly lines of containers to waiting positions on opposite sides of the container receiving position.

10. An apparatus as set forth in claim 8 including a discharge conveyor leading away from the container receiving position, and pusher means for pushing the completed package away from the container receiving position and onto the discharge conveyor.

11. An apparatus as set forth in claim 8 in which the container carrier is formed with annular upstanding gripping surfaces and in which the means for holding and setting up the container carrier includes an annular array of articulated fingers engageable with the gripping surface of each channeled element.

12. An apparatus as set forth in claim 8 including a pair of conveyors for advancing containers to waiting position on opposite sides of the container receiving position and in positions to be engaged by said pusher means, a discharge conveyor leading away from the container receiving position, and pusher means for pushing the completed package away from the container receiving position and onto the discharge conveyor.

13. An apparatus for packaging a plurality of containers having cylindrical chimes at both ends in a container carrier which includes upper and lower channeled elements initially lying side by side and joined by connecting means integrally formed with both channeled elements comprising means engaging one of the channeled elements and holding it in the container receiving position, means engaging the other channeled element and transporting it in a path limited by the connecting means from the initial side-by-side position to a position in which one channeled element is above the other at a distance permitted by the connecting means and in which the channeled elements are facing each other, and pusher means for pushing the containers simultaneously and in opposite directions into the container carrier between the upper and lower channeled elements so that the containers are locked together therebetween.

References Cited

UNITED STATES PATENTS

| | | | |
|---|---|---|---|
| 3,192,682 | 7/1965 | Bernat | 53—48 XR |
| 3,245,196 | 4/1966 | De Shazor et al. | 53—26 |

TRAVIS S. McGEHEE, Primary Examiner

NEIL ABRAMS, Assistant Examiner

U.S. Cl. X.R.

53—29, 48